Feb. 27, 1923.
J. W. LARIMORE
CLUTCH
Filed Sept. 24, 1918
1,447,024
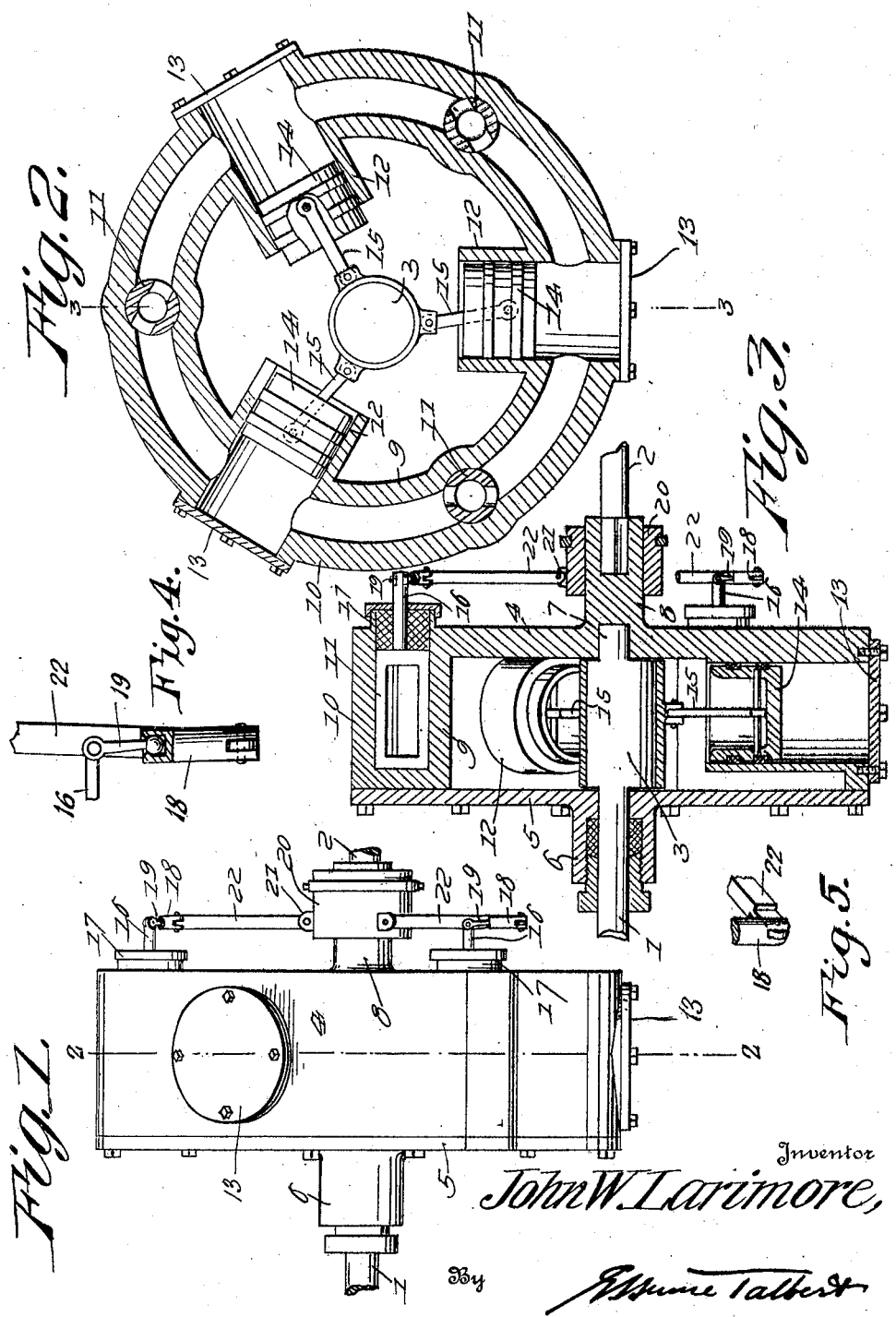
Inventor
John W. Larimore,
By
Attorney Patented Feb. 27, 1923.

1,447,024

UNITED STATES PATENT OFFICE.

JOHN W. LARIMORE, OF MOUNTAIN GROVE, MISSOURI.

CLUTCH.

Application filed September 24, 1918. Serial No. 255,462.

*To all whom it may concern:*

Be it known that I, JOHN W. LARIMORE, a citizen of the United States, residing at Mountain Grove, in the county of Wright and State of Missouri, have invented new and useful Improvements in Clutches, of which the following is a specification.

The invention is designed for the principal purpose of providing a clutch mechanism operable by the transfer of liquid from one point to another within said mechanism, there being means for controlling the rate of flow of said liquid, so that there is provided means for varying the angular speed of one of the clutch members with respect to the other.

A still further purpose of the invention seeks the provision of a clutch of this character which is simple in construction, durable and effective in operation and inexpensive to manufacture.

Still further and other purposes will appear as the invention is set forth in detail in the following description.

Described and illustrated in a specific embodiment, the invention is not to be restricted thereto. The right is reserved to make such changes or alterations as the actual reduction to practice may show to be of advantage, provided such changes or alterations are comprehended in spirit by the annexed claims.

A uniform system designating the various parts obtains in all of the several figures of the drawings, wherein:

Figure 1 is a view in elevation of what at present is thought to be the preferred embodiment of the invention, Figure 2 is a section on the line 2—2 of Figure 1, Figure 3 is a section on the line 3—3 of Figure 2, Figure 4 is a detail view showing the two-part arms employed in connection with the valve operating mechanism.

Figure 5 is a detail view showing the pivotal connection between the thimble operated connecting rod and one element of the connecting two-part arm.

Referring to the drawings there are shown the end portions 1 and 2 of a driving and driven shaft respectively. The driving shaft is formed with an eccentric 3, and the said shaft carries in surrounding relation to this crank, a casing 4 which is permanently closed on one side and on the other side is closed by a detachable cover plate 5, the latter plate being formed with a hub 6 which loosely surrounds the shaft 1 adjacent to the eccentric. The extremity 7 of the shaft 1 is journaled in the center of the side wall of the casing 4, this side wall being on the permanently closed side of the casing and having formed therewith at its center, a hub 8 in which there is received the end of the shaft 2.

The casing 4 is formed with inner and outer circular walls 9 and 10 which are interconnected on the side opposite that on which the hub 8 is formed, and the space between these walls is designed for filling with a suitable fluid, preferably oil. At angular distances 120 degrees apart, the casing 4 is formed with valve seats, so that plug valves 11 may be employed to place into communication or to close communication between the said space on either side of each valve seat.

Medially disposed between the valve seats and radially arranged, the casing 4 is formed with cylinders 12 which communicate with the space between the walls 9 and 10 on either side of the cylinders. The casing 4 is so formed that the cylinders open on the periphery thereof, but are kept normally closed by detachable cover plates 13. The cylinders extend through the inner circular walls 9 to provide for a relatively long stroke of each of the pistons 14 which is carried within and which is longitudinally movable in each of them. Each of the pistons 14 is provided with a connecting rod 15, the three connecting rods connecting with the eccentric 3 of the shaft 1.

Each of the plug valves 11 is formed with a stem 16 which projects through the side wall of the casing 4 and which is surrounded by a stuffing box 17 formed integral with the side wall of the casing and provided as a means to prevent leakage of the fluid around the valve stem. At the free ends of the stems 16, there are carried the two-part arms comprising the sections 18 and 19, the section 19 being secured to the stem while the section 18 is so connected with the previous section that a slight amount of angular movement is afforded the section 18.

Loosely mounted upon the hub 8 and mounted for longitudinal movement thereon, but secured against angular movement, there is a thimble 20 provided with a circumferential groove for engagement with a suitable shifter to effect the desired longitudinal movement of the thimble. The thimble is formed on its periphery with three pairs of ears 21 the individual pairs being spaced at uniform angular distances apart. The thimble is connected with the aforesaid two-part arms by means of connecting rods 22. One end of each of these connecting rods is received between the two ears 21 of each pair, while the other end is bifurcated and straddles the free end of the section 18 of its attendant two-part arm, the connecting rod effecting a pivotal connection both with the section 18 and with the thimble.

It will be observed that longitudinal movement imparted to the thimble 20 will, through the instrumentality of the connecting rods 22 and the two-part arms, operate to effect angular movement of the valves 11, either moving them to the open or to the closed position, depending on the direction of movement of the thimble. Let the valves be in the full open position and let the shaft 1 be put in motion, this shaft being the driving shaft. The movement of the shaft 1, through its eccentric 3, will operate to move the pistons 14 longitudinally in the cylinders 12, and the fluid which is contained in the cylinders and in the space between the walls 9 and 10 will be transferred from one cylinder to the other, since the piston forcing the liquid out of one cylinder will transfer it to another cylinder, the piston in that cylinder moving to increase the body of the cylinder for the reception of the said fluid. This condition can obtain without any relative movement of the casing 4, but as the thimble 20 is moved so as to turn the valves 11 toward the closed position, the transfer of the fluid from one cylinder to another requires a greater length of time than with the valves in the full open position, since the fluid is required to pass through an opening restricted in cross sectional area by the partial closing of the valves. Therefore, the casing 4 is required to move while this fluid is being transferred from one to the other of the cylinders, but its angular speed is not equal to the angular speed of the shaft 1 because of the transfer of the fluid, since as long as there is means for such transfer, the casing 4 will rotate in the direction of the shaft, but will lag behind the latter. When the valves 11 are completely closed, however, as they will be when the thimble is moved to its closest position to the side wall of the casing 4, there will be no means for the transfer of the fluid from one cylinder to the other, and therefore, the casing will rotate in synchronism and will perforce drive the shaft 2 at the same speed. It is thus seen that the shaft 2 may be allowed to remain at rest, to rotate in synchronism with the shaft 1 or made to rotate at any speed between the speed of the shaft 1 and a state of rest.

The invention having been described, what is claimed as new and useful is:

1. In a fluid clutch, the combination with a driving shaft, of a casing in surrounding relation to the shaft and loosely mounted thereon, the casing being formed with inner and outer circular walls between which there is comprehended a fluid containing space, the casing being further formed with radially disposed cylinders having one end opening into the space between said circular walls, pistons movable in the cylinders and operatively connected with the driving shaft, plug valves having their axes disposed parallel to the axis of the shaft and interposed between the inner and outer circular walls and at intermediate points between the cylinders, a thimble loosely mounted on a hub formed with the casing, the valves having stems the extremities of which are exteriorly exposed, two-part arms comprising pivotally connected sections one of each of which is connected to one of said stems, and connecting rods pivotally connected at one end with the thimble and at the other end with the extremities of the remaining sections of the two-part arms as herein shown and for the purpose specified.

2. In a fluid clutch, the combination with a driving shaft, of a casing in surrounding relation to the shaft, the said casing being permanently closed on one side and provided with a detachable cover plate on the other side, the casing adjacent its periphery being formed with spaced annular walls interconnected on the side opposite the closed side of the casing to define a fluid containing space, pistons movable in radially disposed cylinders formed with the casing and opening at one end into the space between said annular walls, connections between the shaft and the pistons, plug valves disposed in the space between the annular walls and having exteriorly exposed operating stems, and means for imparting turning or angular movement of said stems to position the valves to open or close communication between adjacent cylinders in the manner and for the purpose specified.

In testimony whereof I affix my signature.

JOHN W. LARIMORE.